United States Patent
Chou et al.

(10) Patent No.: US 6,759,264 B2
(45) Date of Patent: Jul. 6, 2004

(54) PRESSURE TYPE FINGERPRINT SENSOR FABRICATION METHOD

(75) Inventors: Bruce C. S. Chou, Hsinchu (TW); Ben S. B. Chang, Hsinchu (TW); Wallace Y. W. Cheng, Hsinchu (TW)

(73) Assignee: Ligh Tuning Technology Inc., Hsinchu (TW)

( * ) Notice: Subject to any disclaimer, the term of this patent is extended or adjusted under 35 U.S.C. 154(b) by 0 days.

(21) Appl. No.: 10/434,833

(22) Filed: May 13, 2003

(65) Prior Publication Data

US 2003/0215976 A1 Nov. 20, 2003

(30) Foreign Application Priority Data

May 17, 2002 (TW) .......................... 91110443 A

(51) Int. Cl.⁷ .............................................. H01L 21/00
(52) U.S. Cl. .......................................... 438/48; 438/53
(58) Field of Search ...................................... 438/48–54

(56) References Cited

U.S. PATENT DOCUMENTS 5,177,661 A * 1/1993 Zavracky et al. ........ 361/283.4
5,242,863 A * 9/1993 Xiang-Zheng et al. ........ 438/53

* cited by examiner

Primary Examiner—H. Jey Tsai
(74) Attorney, Agent, or Firm—Rosenberg, Klein & Lee

(57) ABSTRACT

The present invention provides a fabrication method of a pressure type fingerprint sensor, which uses the commercial integrated circuit process to form the sensor and the processing circuit together on the same chip. The present invention comprises a plurality of capacitive pressure sensors arranged in a 2-D array and applies the charge sharing principle to each capacitive pressure sensor for signal reading. The main structure of each pressure sensor is a pair of plate electrodes with an air gap between them to form a plate sensor capacitor, wherein the plate electrodes comprise a floating electrode and a fixed electrode. When the finger ridge contacts the floating electrode, the pressure from the finger changes the spacing of the air gap so as to change the capacitance of the plate sensor capacitor. The 2-D sensor array can read the 2-D pressure distribution pressed by the finger ridge to construct the fingerprint pattern.

11 Claims, 4 Drawing Sheets

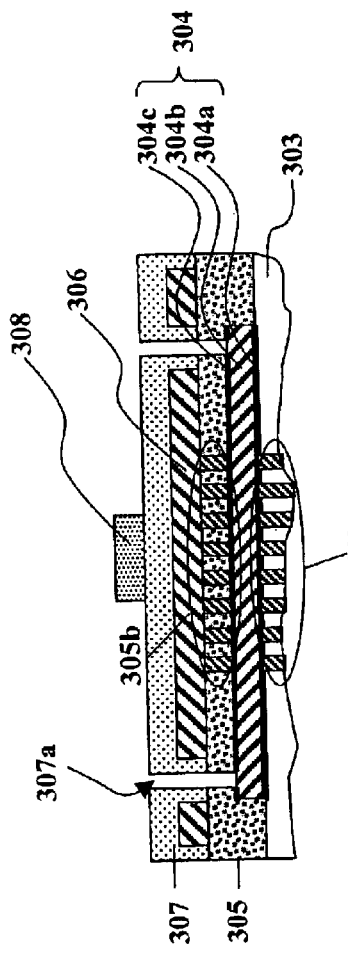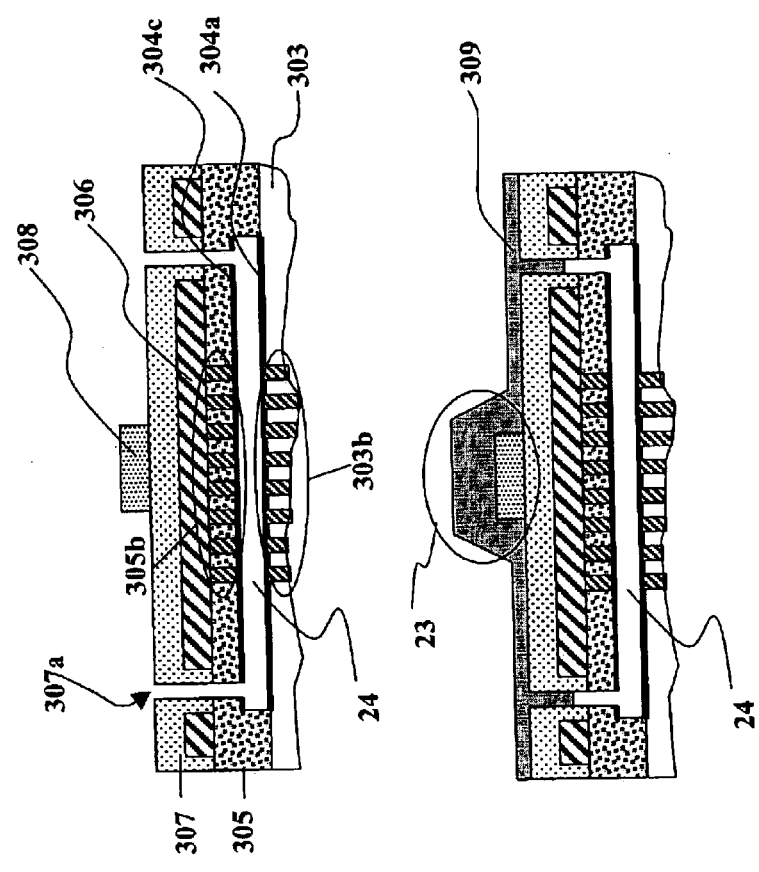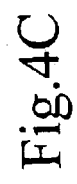
Fig.4A
Fig.4B
Fig.4C

PRESSURE TYPE FINGERPRINT SENSOR FABRICATION METHOD

BACKGROUND OF THE INVENTION

1. Field of the Invention

The present invention generally relates to a fabrication method of a sensor device, and more particularly relates to an integrated capacitive pressure sensor array manufactured by micromachining technology and CMOS process for fingerprint sensing.

2. Description of the Prior Art

There are many known techniques of identifying an individual through the identification of the individual's fingerprint. The use of an ink pad and the direct transfer of ink by the thumb or finger from the ink pad to a recording card is the standard way of making this identification. Then, an optical scanner scans the recording card to get an image, which is then compared to fingerprint images in the computer database. However, the most serious drawback of the above-mentioned method is that the fingerprint identification cannot be processed in real-time, and thus cannot satisfy the requirement of real-time authentication, such as network authentication, e-business, portable electronics products, personal ID card, security system, and the like.

The method for reading a fingerprint in real-time has become the important technology in the biometrics market. Conventionally, an optical fingerprint sensor may be used to read a fingerprint in real-time, which can be referred to in U.S. Pat. Nos. 4,053,228 and 4,340,330, and the development is quite mature and accurate. However, the optical fingerprint sensor has a drawback because it is large in size.

Consequently, silicon fingerprint sensors, which overcome the drawbacks of the optical sensor and are formed by silicon semiconductor technology, have been developed. According to the consideration of silicon integrated circuit (IC) processes, the capacitive fingerprint sensor has become the most direct and simple product, which is referred to in U.S. Pat. Nos. 4,290,052 and 4,353,056. However, the problem with the capacitive fingerprint sensor is that it does not effectively overcome the interference problem caused by moisture on the finger and ESD damage to the sensor circuits.

The latest method utilizes capacitive pressure sensor array fabricated by micromachining technology, as the detecting method of the fingerprint. The related material is referred to in appendix 1 "A High Density Capacitive Pressure Sensor Array For Fingerprint Sensor Application" disclosed by Rey et al.; appendix 2 "A Very High Density Bulk Micromachined Capacitive Tactile Imager" disclosed by De Souza et al.; and appendix 3 "MEMS Fingerprint Sensor With Arrayed Cavity Structures" disclosed by Sato et al., which utilize the pressure pressed from the ridge of the fingerprint for the sensing principle to effectively overcome the above mentioned moisture problem of the capacitive fingerprint sensor. However, the methods disclosed by Rey, De Souza, et al. can not be effectively integrated into the integrated circuit process. Hence, it is not feasible for actual use. The post-IC method disclosed by Sato et al. utilizes an electroplated gold material and sacrificial layer technology to form the pressure sensor structure. However, it increases the process complexity, reduces the yield, and increases the cost. Furthermore, the gold material is not compatible with silicon integrated circuit processing and causes pollution problems.

SUMMARY OF THE INVENTION

An object of the present invention is to provide a fabrication method of a pressure type fingerprint sensor, which comprises a plurality of capacitive pressure sensors arranged in a 2-D array for reading the fingerprint, to overcome interference problems caused by the moisture of a finger and to overcome the ESD damage to the sensor circuit. The fabrication method of the present invention is completely compatible with commercial integrated circuit processes, especially the CMOS process and material. Additionally, the present invention can improve the yield and reduce the cost.

Another object of the present invention is to form a pressure type fingerprint sensor, which applies the charge sharing principle to detect the capacitance variation of each capacitive pressure sensor.

In order to achieve these and other objects, the present invention discloses a fabrication method of a pressure type fingerprint sensor comprising a pressure sensor array and a set of processing circuitry. Wherein, the pressure sensor array comprises a plurality of pressure sensors arranged in a 2-D array. Each of the pressure sensors further comprises a plate sensor capacitor comprising a floating electrode, an air gap, and a fixed electrode; a reference capacitor connected to the fixed electrode; and a signal reading unit arranged beside the sensor capacitor for reading the sensor capacitance and connecting to the processing circuitry. Wherein, the floating electrode is used as a contacting surface on which the finger is positioned. The pressure pressed from the ridge of the fingerprint changes the spacing of the air gap so as to change the sensor capacitance. The sensor capacitor further includes a protrusion arranged at a central portion of the contacting surface as a stress concentration point to enhance the displacement of the floating electrode when contacted by the finger ridge. There is further a protection layer formed on the most outer surface for wearing and chemical resistance purposes.

Other aspects, features, and advantages of the present invention will become apparent, as the invention becomes better understood by reading the following description in conjunction with the accompanying drawings.

BRIEF DESCRIPTION OF THE DRAWINGS

The foregoing aspects and many of the accompanying advantages of this invention will become more readily appreciated as the same becomes better understood by reference to the following detailed description, when taken in conjunction with the accompanying drawings, wherein:

FIG. 4A to FIG. 4C are schematic representations of fabrication flows of the pressure type fingerprint sensor, in accordance with one embodiment of the present invention.

DESCRIPTION OF THE PREFERRED EMBODIMENTS

Figure 1:
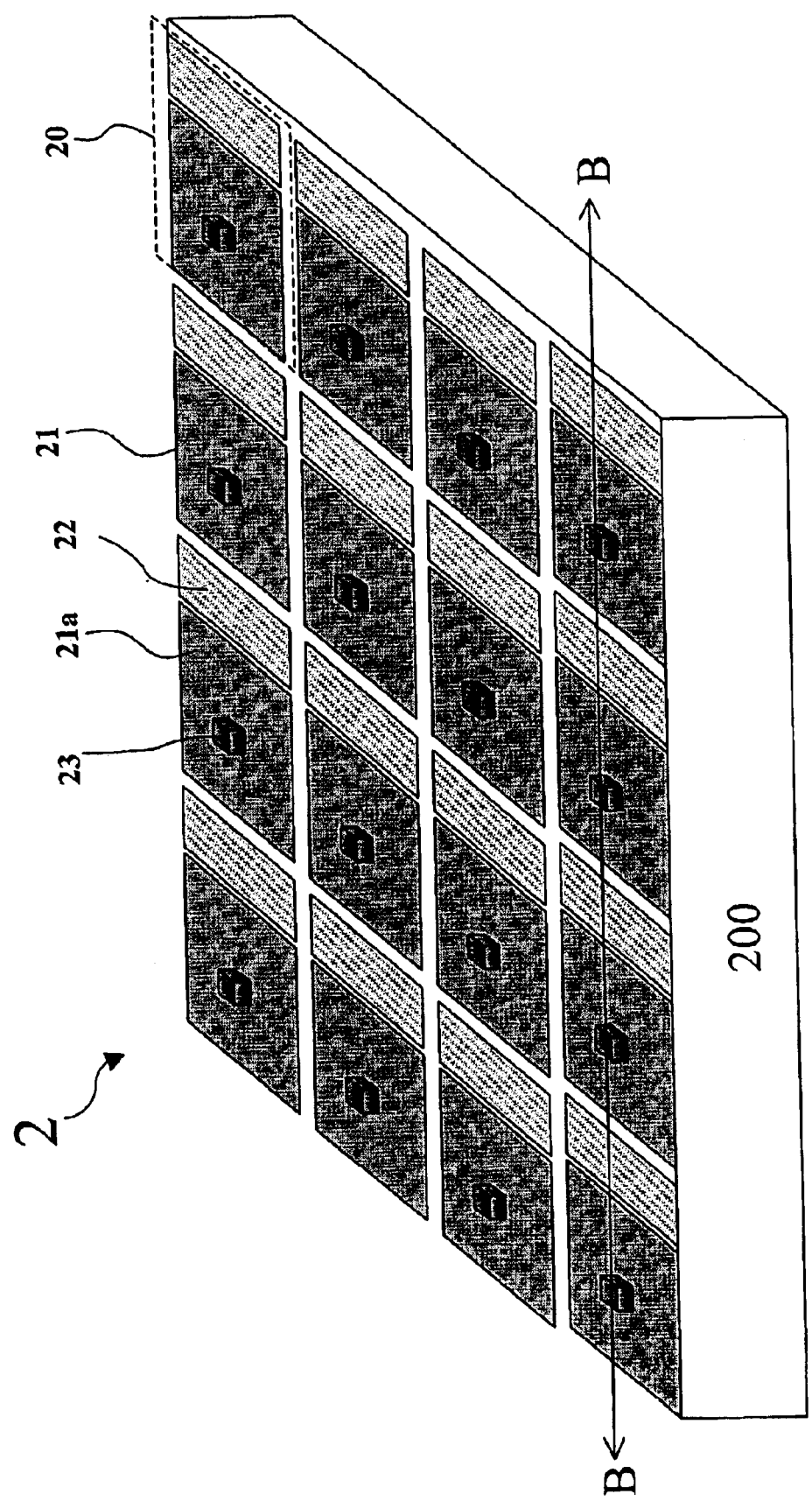
FIG. 1 is a 3-D schematic representation of the pressure type fingerprint sensor, in accordance with the present invention.

Refer to the FIG. 1, which is a 3-D schematic representation of a portion of a pressure type fingerprint sensor 2 in accordance with one embodiment of the present invention. It comprises a plurality of pressure sensors 20 in 2-D array formed on a silicon substrate 200. The structure of each pressure sensor 20 is a plate sensor capacitor 21 comprising a fixed electrode at the bottom (not shown in the figure) and a floating electrode 21a. The floating electrode 21a is a diaphragm structure with its periphery fixed on the silicon substrate 200 and there is an air gap between the floating electrode 21a and the fixed electrode (not shown in the figure). In addition, on the central portion of the floating electrode 21a, at least, one protrusion 23 is formed as a stress concentration point by contact with the finger ridge to enhance the displacement (the change of the capacitance will become bigger) of the floating electrode 21a to improve the sensitivity. Simultaneously, there is further a protection layer formed on the outer most layer for wearing and chemical resistance purposes.

In each pressure sensor 20, a reference capacitor is designed under each sensor capacitor 21 (not shown in the figure) and a signal reading unit 22 based on charge sharing configuration is positioned by the sensor capacitor 21 to in situ process and output the detected signal. A detailed description regarding signal reading unit 22 of the pressure sensor 20 of this invention may be found in commonly-owned, co-pending U.S. patent application Ser. No. 10/403, 052, filed Apr. 1, 2003 and entitled "CAPACITIVE FINGERPRINT SENSOR," the disclosure of which is incorporated by reference as if fully set forth herein.

Figure 2:
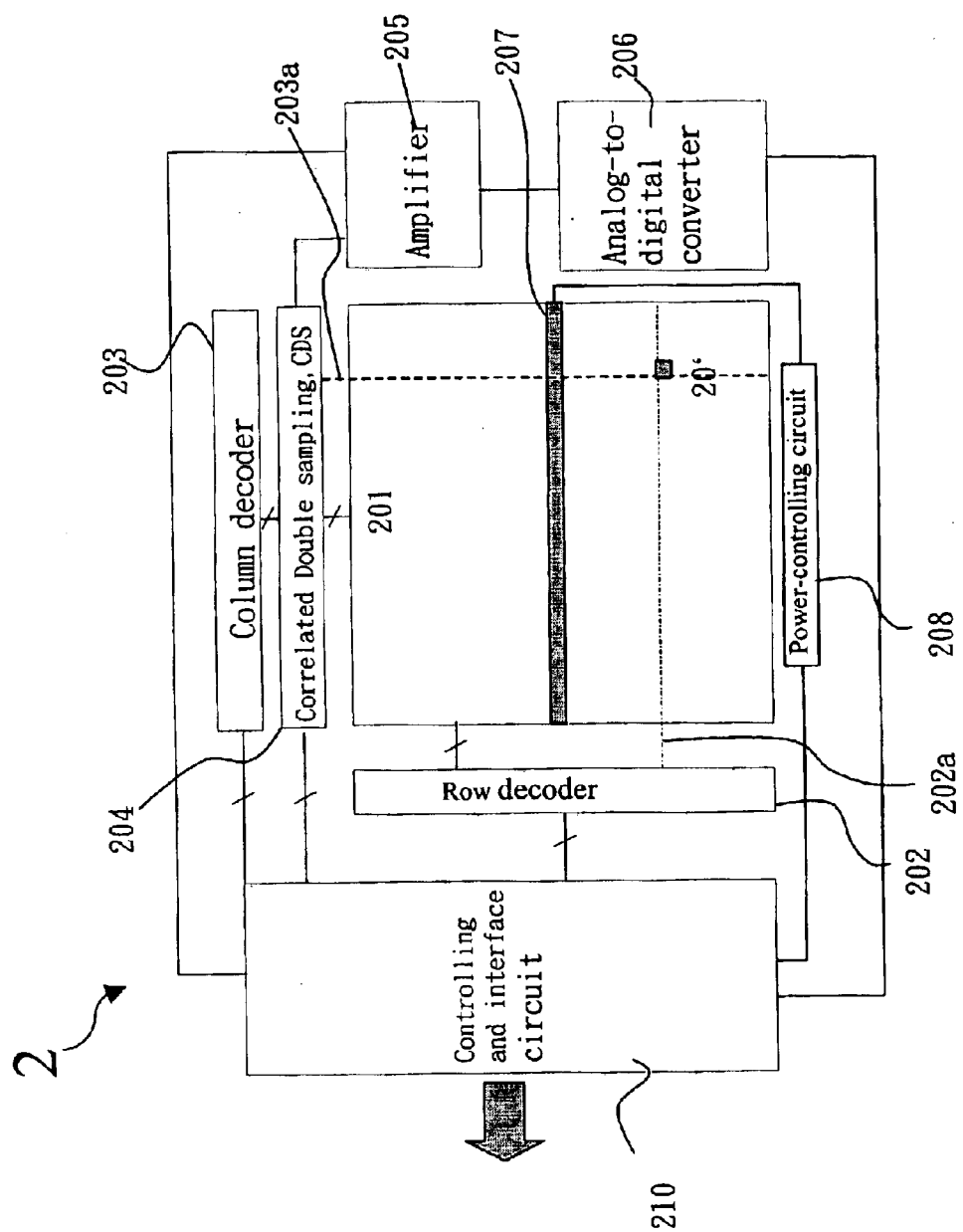
FIG. 2 is a block diagram of the pressure type fingerprint sensor, in accordance with the present invention.

In order to more clearly explain the architecture of the pressure type fingerprint sensor shown in FIG. 1, please refer to FIG. 2, which is a block diagram of the system configuration of the pressure type fingerprint sensor in accordance with an embodiment of the present invention. The pressure type fingerprint sensor mainly consists of a pressure sensor array 201. A set of processing circuitry is composed of a row decoder 202, a column decoder 203, a correlated double sampler (CDS) 204 (the column decoder 203 combining the CDS 204 is named column multiplexer hereafter). The row decoder 202 is arranged beside the sensor array 201. The column multiplexer is arranged beside the sensing members array 201 and at a side perpendicular to the row decoder 202.

The row decoder 202 controls the charging and charge-sharing in a specific pressure sensor 20' through a specific set of control line 202a. Then, a voltage signal output from the pressure sensor 20' is obtained by the column multiplexer via a specific signal line 203a. The obtained voltage signals may be sequentially amplified and converted into digitally gray-scale image by an analog signal processing unit including a programmable gain amplifier 205 and an analog-to-digital converter 206. The actions mentioned above are all controlled by a controlling and interface circuit 210.

At the same time, a trigger electrode layout 207 is designed amid the pressure sensor array 201. This layout of the trigger electrode ensures at least a portion of the finger can contact over the trigger electrode surface to switch on the power-controlling circuit 208. The power-controlling circuit 208 will turn on the power of this fingerprint sensor while the finger contacts the sensor surface. A detailed description regarding the trigger design of this invention may also be found in commonly-owned, co-pending U.S. patent application Ser. No. 10/403,052, filed Apr. 1, 2003 and entitled "CAPACITIVE FINGERPRINT SENSOR," the disclosure of which is incorporated by reference as if fully set forth herein.

Figure 3:
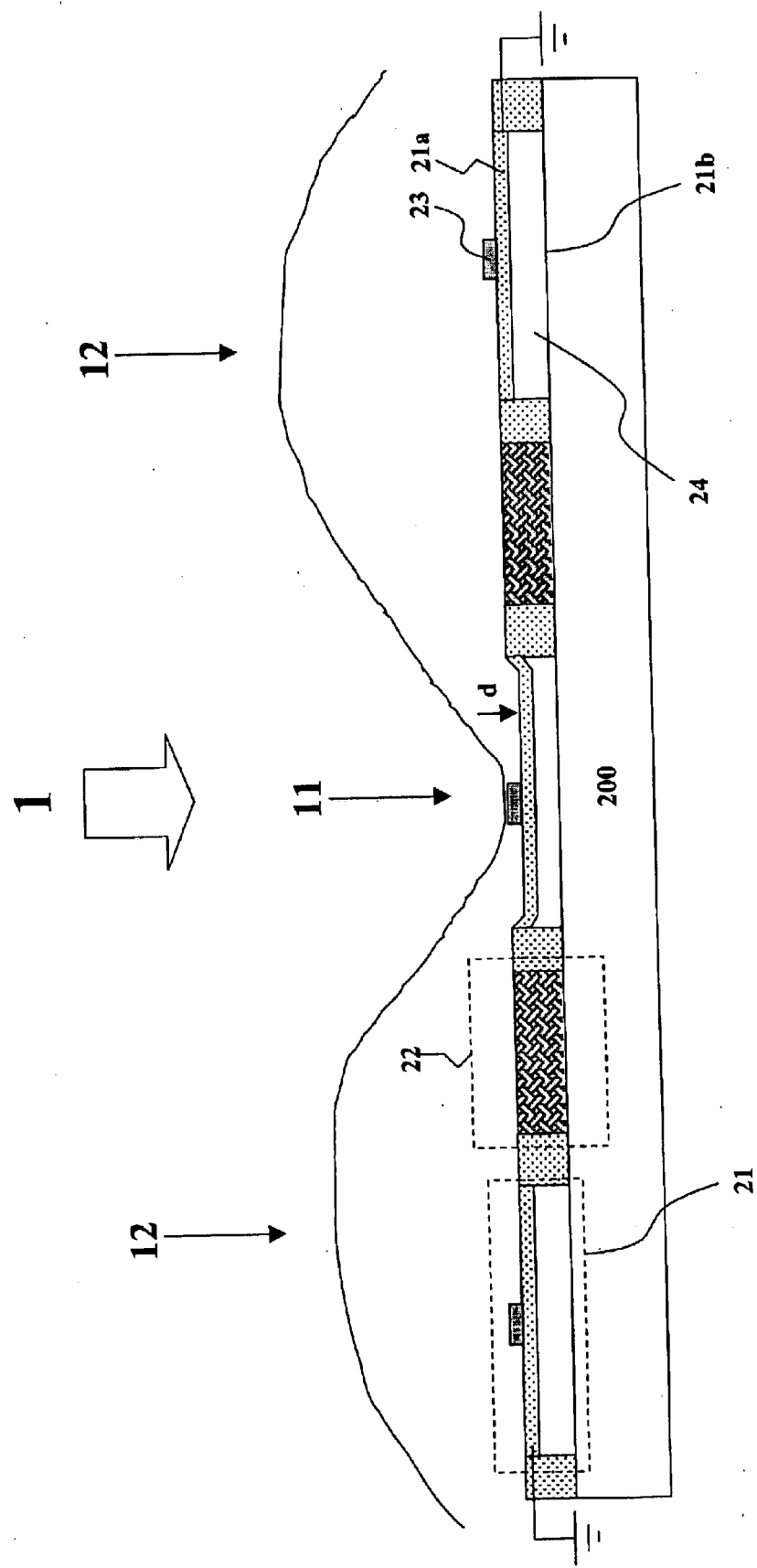
FIG. 3 is a schematic representation of reading the fingerprint by the pressure type fingerprint sensor, in accordance with the present invention.

Refer to FIG. 3, which is a schematic representation of reading the fingerprint by the pressure type fingerprint sensor. Wherein, the plate sensor capacitor 21 is composed of a floating electrode 21a and a fixed electrode 21b. There is an air gap 24 between these two electrodes 21a and 21b. There is a protrusion 23 formed on the central region of the floating electrode 21a as a stress concentration point by contact with finger ridge to enhance the displacement (the change of the capacitance will become bigger) of the floating electrode 21a to improve the sensitivity.

When the finger 1 touches the pressure sensor array, only a portion of the sensors is touched by the finger ridge 11 (a portion of the sensors is covered under the finger valley 12) to sense the pressure from the finger 1. The pressure will cause a displacement d of the floating electrode 21a to change the sensor capacitance between two electrodes, wherein the amount of the displacement is dependent on the pressure extent. After collecting the voltage signals from the sensor array 201, the amount of sensors touched by the finger ridge 11 will be configured to reconstruct the ridge pattern as the fingerprint data. This sensing principle completely overcomes the moisture problem mentioned above due to its discrimination of pressure from a finger or not. Simultaneously, the floating electrode 21a is connected to ground so that ESD from any approaching body will be directly conducted to ground to avoid damaging the sensor circuit.

A superior advantage of the manufacturing of the pressure type fingerprint sensor of the present invention is that the present invention fully utilizes a commercial sub-micro integrated circuit process with aluminum interconnections (n layers of Al interconnections for simplified explanation), especially the Complementary Metal Oxide Semiconductor (CMOS) process. In order to simplify the description, herein only explains how to utilize the CMOS process to complete the structure design and the material properties of a single pressure sensor 21. Other circuit designs and manufacturing are well-known technology, so will not be discuss herein.

Refer to FIG. 4A, which is a semi-finished structure of a single pressure sensor 21 completed by a commercial CMOS process. The present invention utilizes the $(n-1)^{th}$ metal layer 304 as a sacrificial layer material. The structure of the metal layer 304 is usually a sandwich structure of titanium 304a, aluminum alloy 304b, and titanium nitride 304c. A plurality of plug metals 303b feedthrough the $(n-2)^{th}$ inter metal dielectric (IMD) layer 303 to connect the metal layer 304 and the interconnection layer there below (not shown in the figure), such as a metal layer or a polysilicon layer. A plurality of plug metals 305b feedthrough the $(n-1)^{th}$ IMD layer 305 to connect the metal layer 304 and the $n^{th}$ metal layer 306 A passivation layer 307 covers the most outer surface of the sensor. The etching window 307a is formed to remove a portion of the passivation layer 307, a portion of the $(n-1)^{th}$ IMD layer 305, and a portion of titanium nitride 304c to expose a portion of aluminum alloy 304b. The protrusion 308 can be a patterned polymer, for example cured polyimide, or metal.

Refer to FIG. 4B, after finishing the process of the FIG. 4A, the semi-finished structure is then put into an aluminum etching solution. The chemical solution etches the aluminum alloy 304b away through the etching window 307a to form an air gap 24. The etching solution is composed of phosphoric acid, nitric acid, and acetic acid and can rapidly removes the aluminum material at an etching rate of more than 1 micrometer per minute. At the same time, the etching solution has an excellent selectivity over the titanium 304a and the titanium nitride 304c so as to etch the aluminum alloy 304b only and to leave the titanium 304a and the titanium nitride 304c. The remained titanium 304a is used as the fixed electrode 21b of the plate sensor capacitor 21, and electrically connects to the interconnection layer there below (not shown in the figure) via a plurality of metal plugs 303b. The titanium nitride 304c is used as the floating electrode 21a of the plate sensor capacitor 21, and electrically connects to the n$^{th}$ metal layer 306 via a plurality of metal plugs 305b. A portion of the n$^{th}$ metal layer 306, a portion of the (n−1)$^{th}$ IMD layer 305, and a portion of the passivation layer 307 form the diaphragm structure of the floating electrode 21a of the plate sensor capacitor 21.

Such as shown in the FIG. 4C, there is a protection layer 309 formed on the outer most surface of the device to seal the etching windows 307a and to finish the final pressure sensor structure 21. The protection layer 309 is a dielectric material such as silicon oxide, silicon nitride, or silicon carbide. The protection layer 309 may further include a polyimide layer formed on the dielectric surface as the contacting member of the finger.

In the manufacturing process, the related materials, and the fabrication method of FIG. 4A and FIG. 4B are all completely compatible with all kinds of commercial integrated circuit processing. In the manufacturing process of FIG. 4C, the sensor does not require any photo-masking process which is an important concept of the manufacturing process of the present invention.

Although the present invention has been described in terms of the exemplary embodiments, numerous modifications and/or additions to the above-described embodiments would be readily apparent to those skilled in the art. It is intended that the scope of the present invention extends to all such modifications and/or additions and that the scope of the present invention is limited solely by the claims set forth below.

What is claimed is:

1. A fabrication method of a pressure type fingerprint sensor comprising:
   providing a CMOS process to form a plate sensor capacitor, which comprising:
      a first metal layer;
      a second metal layer;
      an interconnection layer;
      an inter metal dielectric layer arranged between the first metal layer and the second metal layer; and
      a passivation layer covering the first metal layer;
         wherein there are a plurality of first metal plugs connecting the first metal layer and the second metal layer and a plurality of second metal plugs connecting the second metal layer and the interconnection layer; and
      wherein the second metal layer comprises a floating electrode material, an alloy layer, and a fixed electrode material;
   removing a portion of the passivation layer, a portion of the inter metal dielectric layer, and a portion of the floating electrode material of the second metal layer to form an etching window exposing the alloy layer; and
   etching the plate sensor capacitor by an etching solution to remove the alloy layer via the etching window and leave the floating electrode material and the fixed electrode material to form an air gap between them.

2. The fabrication method of the pressure type fingerprint sensor according to claim 1, wherein the floating electrode material comprises titanium nitride.

3. The fabrication method of the pressure type fingerprint sensor according to claim 1, wherein the fixed electrode material comprises titanium.

4. The fabrication method of the pressure type fingerprint sensor according to claim 1, wherein the alloy layer comprises an aluminum alloy layer.

5. The fabrication method of the pressure type fingerprint sensor according to claim 1, wherein etching solution comprises an aluminum etching solution.

6. The fabrication method of the pressure type fingerprint sensor according to claim 5, wherein the aluminum etching solution composes of phosphoric acid, nitric acid, and acetic acid.

7. The fabrication method of the pressure type fingerprint sensor according to claim 1, further comprising a protrusion arranged on the top surface of the passivation layer of the plate sensor capacitor.

8. The fabrication method of the pressure type fingerprint sensor according to claim 7, whereby the protrusion comprises cured polyimide or metal.

9. The fabrication method of the pressure type fingerprint sensor according to claim 1, further comprising forming a protection layer on an outside surface of the passivation layer to seal the etching window.

10. The fabrication method of the pressure type fingerprint sensor according to claim 9, wherein the protection layer comprises silicon nitride, silicon oxide, or silicon carbide.

11. The fabrication method of the pressure type fingerprint sensor according to claim 9, further comprising a polyimide layer on a surface of the protection layer.

* * * * *